Oct. 8, 1935.   G. M. REYNOLDS   2,016,578
PLOWSHARE ATTACHMENT
Filed July 22, 1933
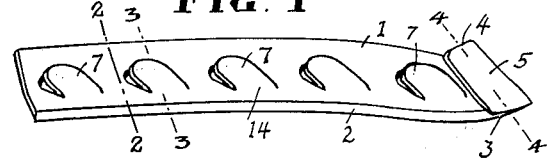
 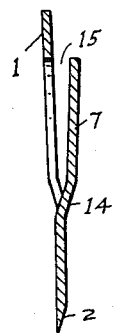 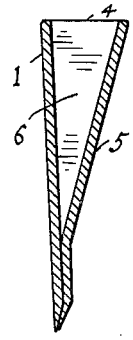
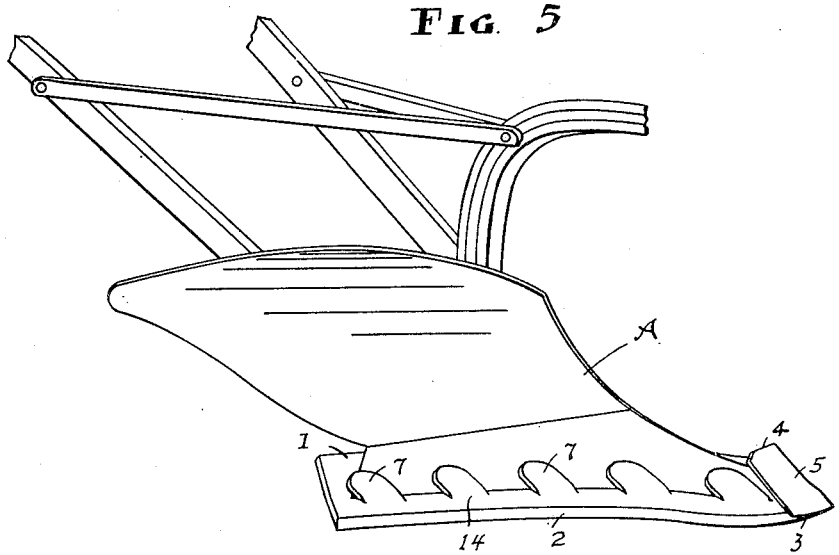
INVENTOR.
GEORGE M. REYNOLDS
BY
ATTORNEY.

Patented Oct. 8, 1935

2,016,578

UNITED STATES PATENT OFFICE 2,016,578

PLOWSHARE ATTACHMENT

George M. Reynolds, Converse, Ind.

Application July 22, 1933, Serial No. 681,753

5 Claims. (Cl. 97—125)

This invention relates to improvements in plow share attachments. An attachment of the kind to which the invention has especial reference, consists essentially of a blade having a cutting edge, and which said blade while capable of being applied to and removed from the share without the use of special implements, is held tenaciously in its position by frictional contact of its parts with the plow share.

Objects of my invention are to provide a device of the above description which is economical of construction, durable and dependable, and which will not interfere with the smooth working and functioning of the plow share.

The above named objects, and also other purposes of the invention which will become apparent as my invention is understood, are accomplished by the new and improved attachment described in the following specification, and illustrated in the accompanying drawing.

Figure 1 is a perspective view of my improved plow share attachment.

Figure 2 is a cross section view taken on line 2—2 in Figure 1.

Figure 3 is a cross section view taken on line 3—3 in Figure 1.

Figure 4 is a cross section view taken on line 4—4 in Figure 1.

Figure 5 is a view showing a plow share, and upon which my improved attachment is applied.

My improved attachment, and which may be termed a renewable cutting blade, is made preferably of steel. It is of dimensions and form to conform to the size and contour of the earth working tool to which it is applied,—in the present instance a conventional plow share A.

The said blade 1 which is of the suitable width shown, is provided with the cutting edge 2, its contour being substantially that of the plow share. The forward portion of said blade, at its lower edge 3 is bent upon itself, and at its upper edge 4 it is bent forwardly and thence substantially in parallelism with the body, the lip 5 formed thereby, being brought about and constituting a pocket 6, V shaped in cross section, as shown in Figure 4, and whose function will be presently referred to.

At spaced locations, from the forward to the rearward end of the blade, are provided integrally formed tongues 7. These tongues have their free ends of the rounded formation as shown in Figure 1, and they are formed by a punch press operation, the metal being severed along the lines defining the shape of the tongue, and each tongue being so bent at its base portion 14, that it is inclined outwardly from the body portion of the blade. In the spaces 15 thereby provided between the tongues and the body portion of the blade, the marginal portion of the plow share is received.

My improved removable cutting blade is applied by positioning it in engagement with the edge portion of the plowshare, and then driving it to place. The body portion of the blade constitutes a stout shank for supporting the cutting edge portion of the blade, and it also constitutes a substantial sheath for the underside of the share. The tongues 7 exercise a tenacious gripping action, and in use, the blade is retained securely in position. The point of the share is enclosed in the pocket 6 and the blade is stayed against any possible tendency to become loosened by reason of any longitudinal strain or stress. The lip 5 besides constituting the wall of the said pocket, and sheath for the plow point, also functions as a fender for the foremost of the tongues 7, thereby minimizing any tendency of the said tongue to become impaired prematurely. The tongues 7 being formed with the rounded top portions are not only economical of formation, but they especially lend themselves to the function of retaining the blade in position, and they present a minimum resistance to the soil as the plow is moved through same.

The usefulness of my improved attachment is apparent. It may be used in connection with a plow that is worn, or one that is new. It is relatively inexpensive, and when it becomes worn, it is easily removed by the use of a hammer or bar applied to its upper edge at the underside of the share. The point portion and body and tongue structure are conventional, and the providing of the invention for plow shares of different lengths, is accomplished by simply the making of the blade in the length required.

What I claim as my invention, is—

1. In a renewable cutting edge for plow shares, an elongated blade including a cutting edge, and fingers struck out from the blade intermediate the cutting and rear edges thereof to facilitate attachment to the cutting edge of a plow share and providing a continuous bar portion at the rear edge of the blade above the free ends of the fingers.

2. In a renewable cutting edge for plow shares, an elongated blade including a cutting edge, and fingers struck out from the blade intermediate the cutting and rear edges thereof to facilitate attachment to the cutting edge of a plow share and providing a continuous bar portion at the rear edge of the blade above the free ends of the fingers, said fingers being bent outwardly of the blade and alined in a plane substantially parallel to and at one side of the blade.

3. In a renewable cutting edge for plow shares, an elongated blade including a cutting edge, and fingers struck out from the blade intermediate the cutting and rear edges thereof to facilitate attachment to the cutting edge of a plow share with the free ends of the fingers extending in the direction of the rear edge, said rear edge being uninterrupted over its entire length to constitute a reinforcement for the points of attachment of the fingers with the blade.

4. In a renewable cutting edge for plow shares, an elongated blade including a cutting edge, and fingers struck out from the blade intermediate the cutting and rear edges thereof with the fingers aligned, the upper portion of the blade being offset from the lower portion on a line through the base of the struck out fingers, each of the fingers being bent forwardly at its base and lying in a plane offset from and substantially parallel with the plane of the lower cutting edge portion of the blade.

5. In a renewable cutting edge for plow shares, an elongated blade including a cutting edge and fingers struck out from the blade intermediate the cutting and rear edges thereof with the fingers aligned, the upper portion of the blade being offset from the lower portion on a line through the base of the struck out fingers, each of the fingers being bent forwardly at its base and lying in a plane offset from the plane of the lower cutting edge portion of the blade, and a return-bent portion at the leading point of the blade welded to the face of the blade in proximity to the adjacent finger.

GEORGE M. REYNOLDS.